(12) United States Patent
Brandl et al.

(10) Patent No.: US 10,724,578 B2
(45) Date of Patent: Jul. 28, 2020

(54) ELASTIC JOINT BODY

(71) Applicant: SUEDDEUTSCHE GELENKSCHEIBENFABRIK GMBH & CO. KG, Waldkraiburg (DE)

(72) Inventors: Marc Brandl, Burgkirchen (DE); Juergen Leinfelder, Waldkraiburg (DE)

(73) Assignee: SUEDDEUTSCHE GELENKSCHEIBENFABRIK GMBH & CO. KG, Waldkraiburg (DE)

(*) Notice: Subject to any disclaimer, the term of this patent is extended or adjusted under 35 U.S.C. 154(b) by 218 days.

(21) Appl. No.: 15/656,354

(22) Filed: Jul. 21, 2017

(65) Prior Publication Data
US 2018/0023630 A1 Jan. 25, 2018

(30) Foreign Application Priority Data

Jul. 21, 2016 (DE) .................. 10 2016 008 921

(51) Int. Cl.
*F16D 3/58* (2006.01)
*F16D 3/62* (2006.01)
(Continued)

(52) U.S. Cl.
CPC .................. *F16D 3/58* (2013.01); *F16D 3/62* (2013.01); *F16D 3/78* (2013.01); *F16D 3/10* (2013.01)

(58) Field of Classification Search
CPC ..... F16D 3/58; F16D 3/10; F16D 3/78; F16D 3/62
(Continued)

(56) References Cited

U.S. PATENT DOCUMENTS

| 4,790,794 A * | 12/1988 | Takeda | F16D 3/62 464/93 |
| 2003/0073500 A1 | 4/2003 | Ishimoto et al. | |
| 2015/0337904 A1* | 11/2015 | Auer | C08K 3/04 464/93 |

FOREIGN PATENT DOCUMENTS

| DE | 3734089 A1 | 6/1988 |
| DE | 10359281 B3 | 8/2005 |

(Continued)

OTHER PUBLICATIONS

Office Action issued by the German Patent and Trademark Office for corresponding German Patent Application No. 102016008921.0. dated Aug. 7, 2017 (English language translation attached).

*Primary Examiner* — Greg Binda
(74) *Attorney, Agent, or Firm* — Moore & Van Allen PLLC; Henry B. Ward, III

(57) ABSTRACT

An elastic joint body for a shaft arrangement for the articulated connection of two shaft sections. The elastic joint body includes bushings and a thread packet situated in a pulling segment and a thread packet situated in a pushing segment, each thread packet having a predetermined axial extension. Further, the elastic joint body includes a support device for guiding the thread packets, which has a plurality of collar elements. The collar elements including a collar element having at least two sections extending in the radial direction. In addition, the elastic joint body includes elastic casing in which the thread packets and the support device are at least partially embedded. The ratio $u_1$ of the sum of the axial extension of the thread packets to the connection diameter is $0.05 \leq u_1 \leq 0.35$.

18 Claims, 10 Drawing Sheets

(51) Int. Cl.
*F16D 3/78* (2006.01)
*F16D 3/10* (2006.01)

(58) Field of Classification Search
USPC ................................................ 464/69, 93–96
See application file for complete search history.

(56) References Cited

FOREIGN PATENT DOCUMENTS

| | | | | |
|---|---|---|---|---|
| DE | 102004029919 A1 | | 1/2006 | |
| DE | 102010046673 A1 | | 3/2012 | |
| DE | 102012001972 | * | 8/2013 | ............... F16D 3/62 |
| DE | 102014000981 A1 | | 8/2014 | |
| IT | 413483 | * | 2/1947 | ..................... 464/69 |
| JP | 2003021161 A1 | | 1/2003 | |
| JP | 4553089 B2 | | 9/2010 | |

\* cited by examiner

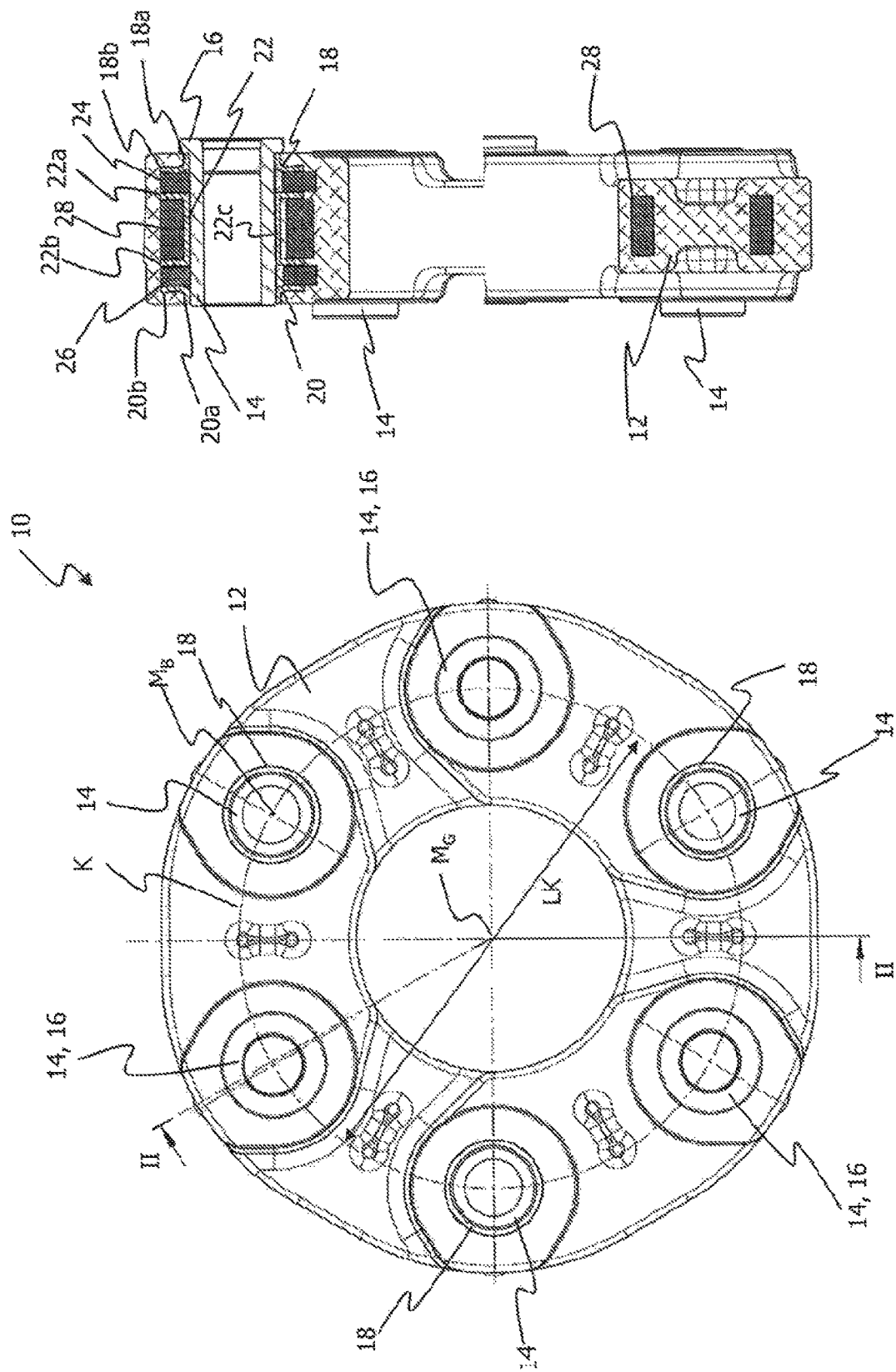

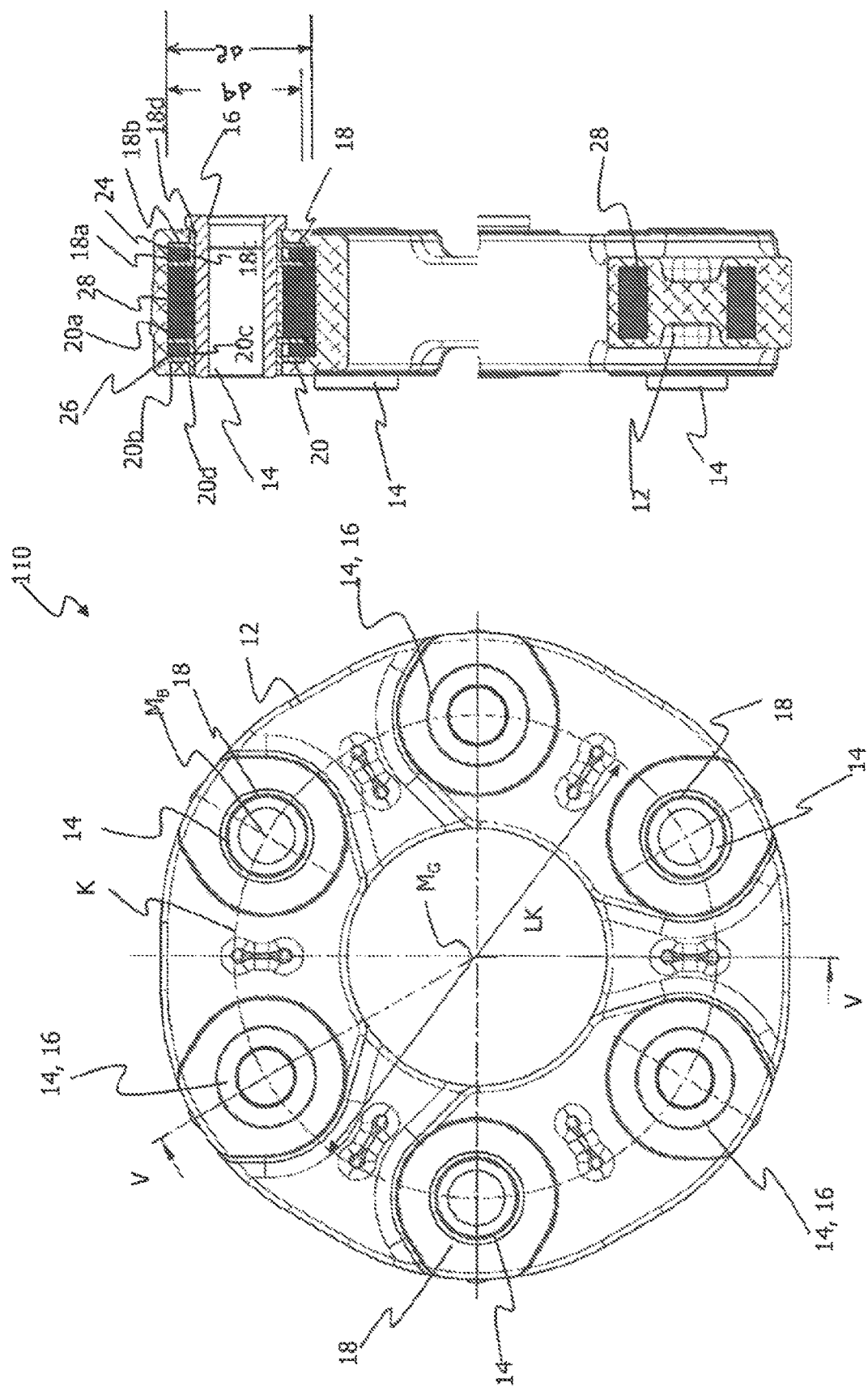

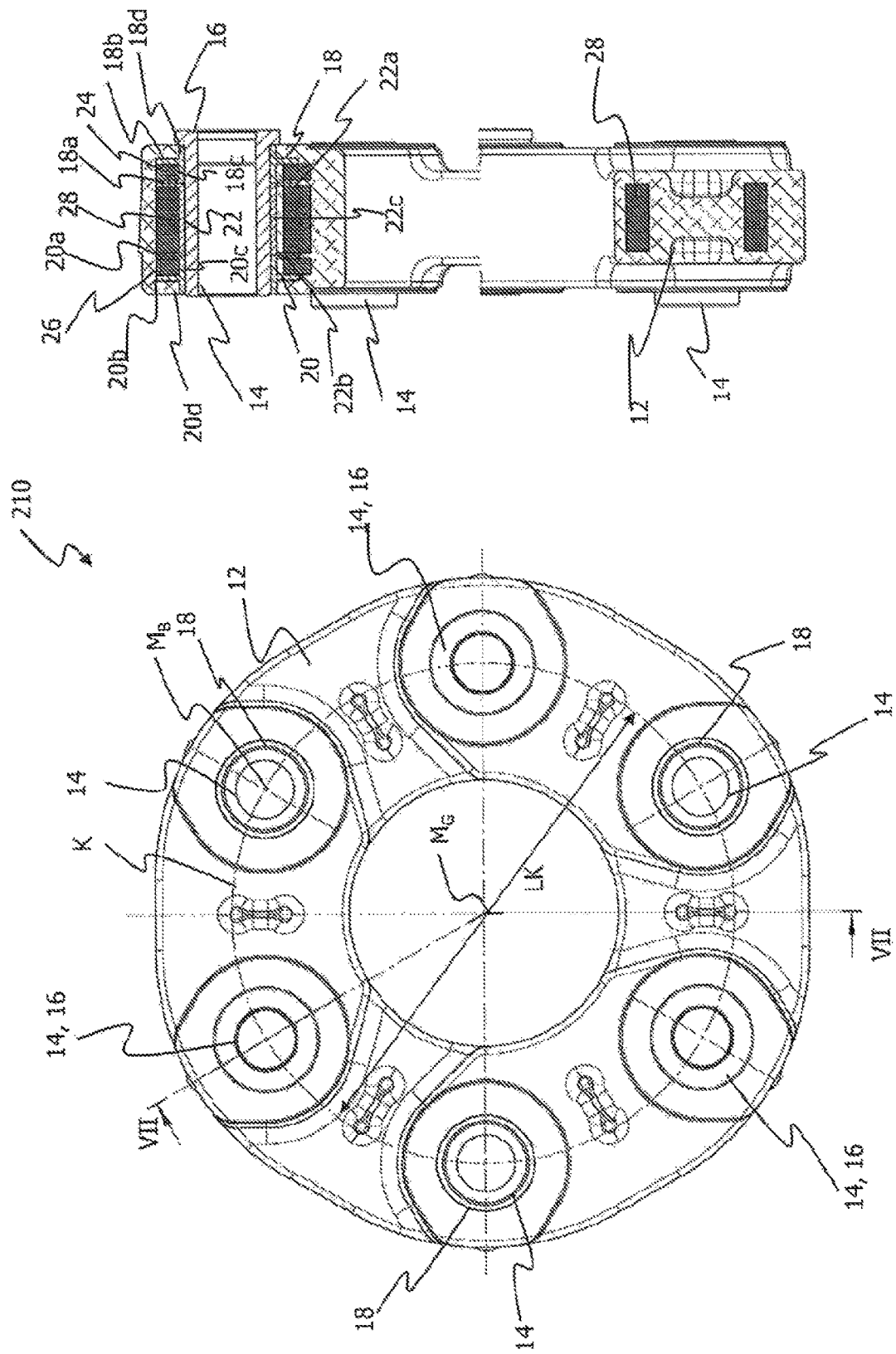

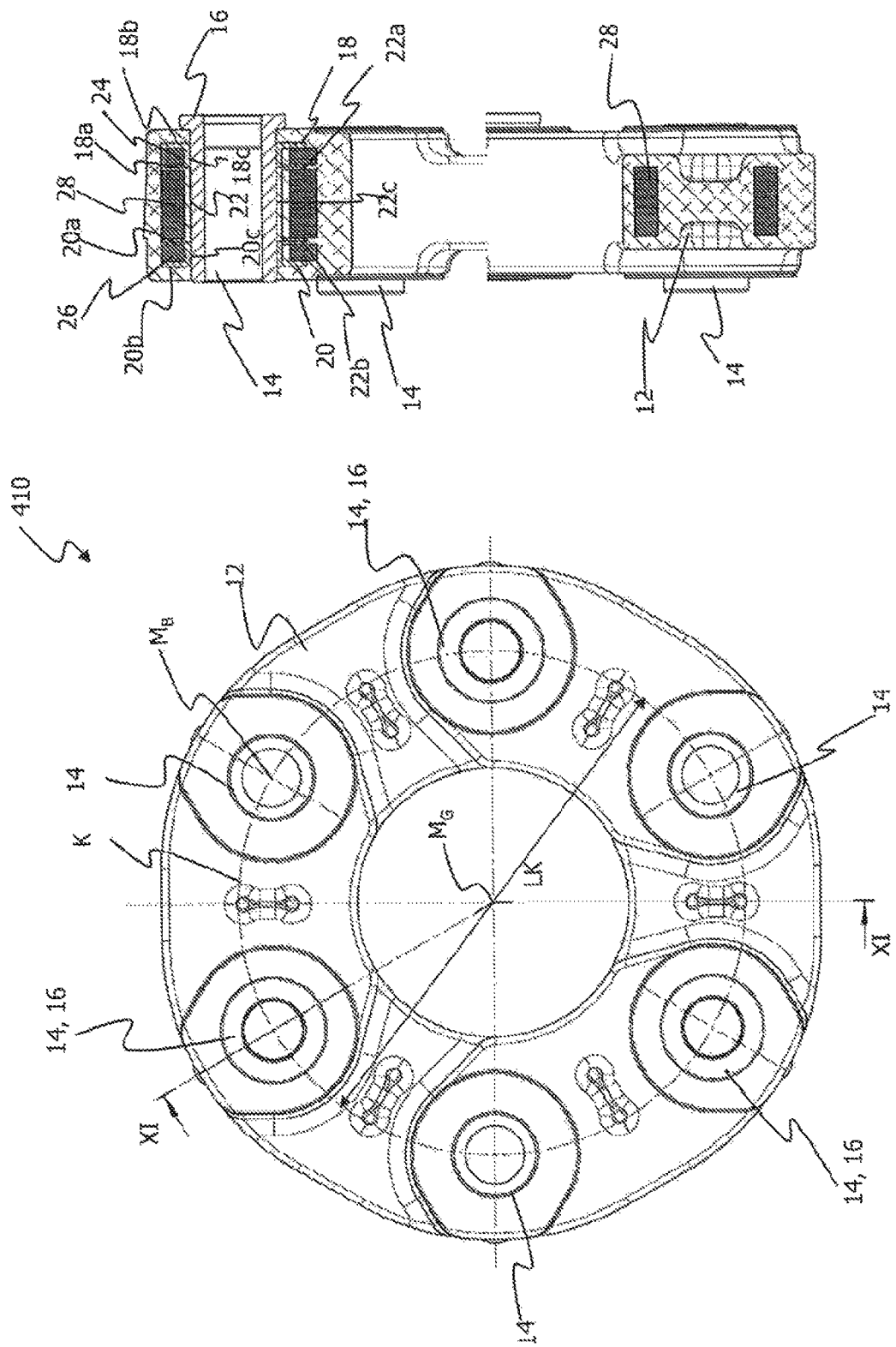

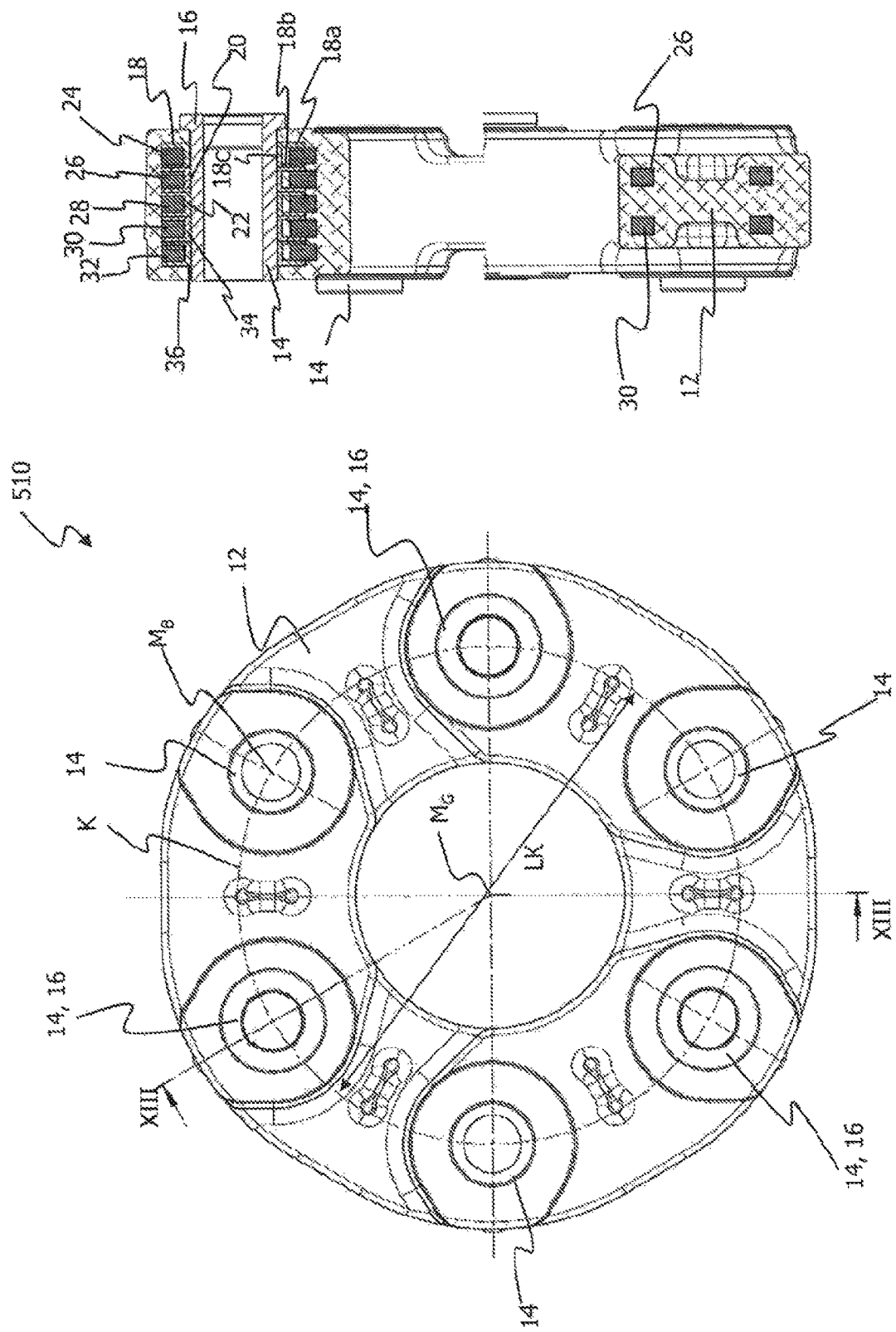

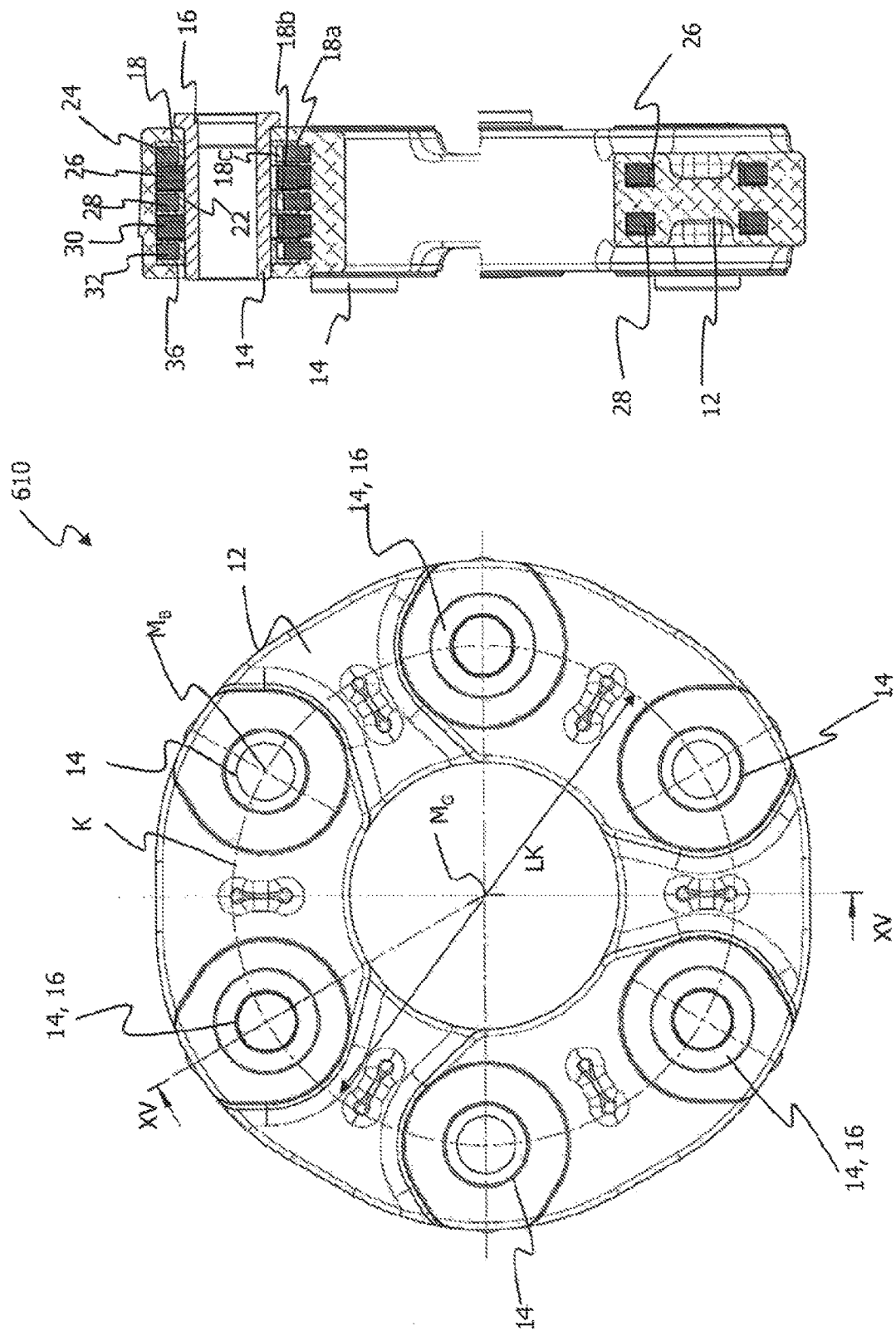

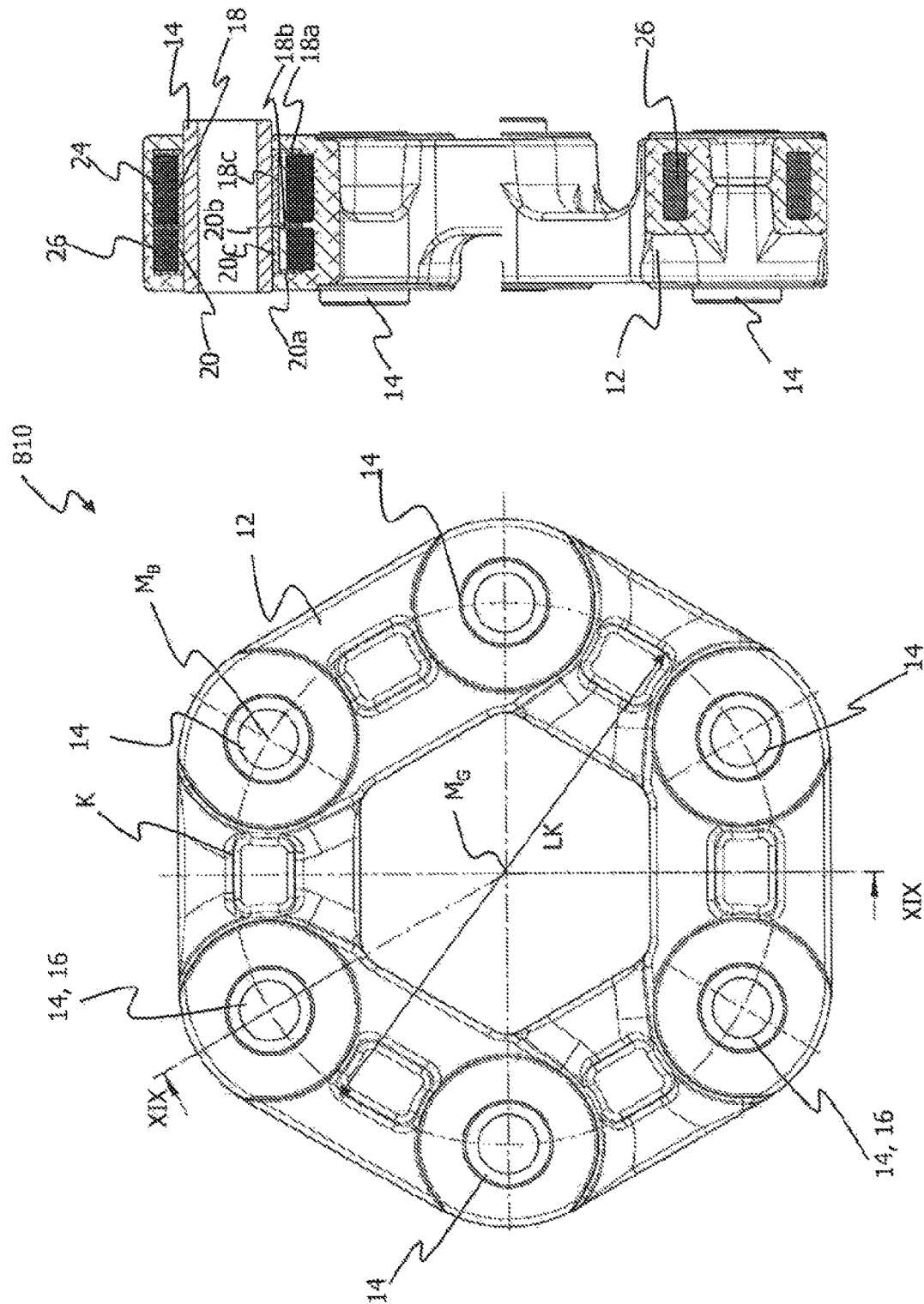

ELASTIC JOINT BODY

The present invention relates to an elastic joint body for a shaft arrangement for the articulated connection of two shaft sections.

Joint bodies of this type are known from the prior art, and disclosed in DE 10 2004 029 989 A1 and DE 37 34 089 A1, for example.

DE 10 2004 029 989 A1 discloses a joint body having bushings, on the axial ends of which collar elements are provided in each case.

DE 37 34 089 A1 discloses an elastic joint body having connecting elements spaced equidistantly at the circumference, and belts made of fiber strand bundles that are wound around pairs of adjacent connecting elements. The belts and connecting elements are accommodated in an elastomeric material.

The object of the present invention is to provide an elastic joint body of the type described at the outset, which with a simple, compact design has an increased service life.

This object is achieved with an elastic joint body having the features discussed below.

Within the context of the present invention, the concept, used many times in the following discussion, of the "axial extension" of various components refers to an extension in the axial direction of the joint body. The joint body has a center axis about which the joint body rotates when torque is transmitted, and a series of bushings whose center axes extend essentially parallel to the center axis of the joint body.

Further embodiments are set forth in the other independent claims and in the dependent claims.

The elastic joint body according to the invention comprises

- a plurality of bushings for connecting to the shaft sections, the center axes of the bushings lying on an imaginary circle about the center axis of the elastic joint body, and the diameter of this circle indicating the connection diameter of the elastic joint body,
- a plurality of thread packets for coupling at least two bushings, each thread packet having a predetermined axial extension,
- at least one support device for guiding the thread packets which has a plurality of collar elements, the plurality of collar elements including at least one collar element having at least two sections extending in the radial direction, and
- at least one elastic casing in which at least the thread packets and the at least one support device are at least partially embedded, wherein the ratio $u_1$ of the sum of the axial extension of the thread packets to the connection diameter is $0.05 \leq u_1 \leq 0.35$.

The elastic joint body according to the invention has pulling segments and pushing segments. The pulling segments and pushing segments alternate in the circumferential direction of the elastic joint body. The thread packets absorb tensile forces depending on the load direction (rotational direction). The articulated device is thus able to transmit torques in two rotational directions. Under torque load in one direction, the thread packet situated in the particular pulling segment absorbs tensile forces (pulling mode). Under torque load in the other direction, the thread packet in the particular pushing segment absorbs tensile forces (pushing mode). Accordingly, a bushing may be wrapped by at least one thread packet situated in the pushing segment and by at least one thread packet situated in the pulling segment, the thread packets being offset relative to one another on the bushing in the direction of the center axis of the bushing. Starting from one bushing, the thread packet situated in the pulling segment extends in the direction of an adjacent bushing, whereas the thread packet situated in the pushing segment extends in the direction of a different bushing.

The ratio $u_1$ results from $$u_1 = \frac{l_1, l_2, \ldots, l_n}{LK}$$

where $l_1, l_2, \ldots, l_n$ indicate in each case the axial extension of the thread packets in the pulling segment and the pushing segment, and LK indicates the connection diameter of the elastic joint body. For example, $l_1$ may indicate the axial extension of a thread packet in the pushing segment, and $l_2$ may indicate the axial extension of a thread packet in the pulling segment. The "axial extension" is understood to mean the extension of the components in question in the direction of the center axis of the bushings and in the direction of the center axis of the elastic joint body. The center axes of the bushings and the center axis of the elastic joint body extend essentially parallel to one another in the unloaded state of the joint body.

The bushings of the elastic joint body are used for connecting the elastic joint body to the shaft sections of a shaft arrangement. A flange that is connected to the elastic joint body via connecting means such as screws and bolts may be provided at each of the shaft sections. These connecting means may extend through the bushings. The bushings may rest with their end-face sides against a flange. A screw head or a head of a bolt may be supported on the respective other end-face side of the bushings. The bushings are situated in such a way that the center axes of the bushings lie on an imaginary circle about the center axis of the elastic joint body. The diameter of this circle corresponds to the connection diameter LK.

Due to the ratio $u_1$ being in a range of $0.05 \leq u_1 \leq 0.35$, a compact design of the elastic joint body is achieved, with which high torques may still be transmitted. Thus, despite its compact design, the elastic joint body has a high power density. In addition, an elastic joint body having the ratio $u_1$ of the sum of the axial extension of the thread packets to the connection diameter has an increased service life.

In addition, due to the support device of the joint body according to the invention, the thread packets in the circumferential area of the bushing are supported under heavy load during operation of the joint body, and friction effects between the thread packets made of the same materials are avoided.

The support device may be made up of axially outer collar elements and one or more axially inner collar elements. The axially outer collar elements are situated in an axial end area of the bushings. The axially inner collar elements are situated in the axial direction, between the axially outer collar elements.

The collar element, having two sections extending in the radial direction, may have a section extending in the axial direction which connects the two radial sections to one another. The collar element may thus have a U-shaped cross section. This type of collar element may accommodate a thread packet between its radial sections, i.e., within its U shape. Such a collar element may, for example, be associated with the thread packet in the pulling segment and accommodate this thread packet. The thread packet in the pulling segment may be separated from the, or the further, thread packets by the collar element. The material thickness of the collar elements is not taken into account in determining the axial extension of the thread packets.

According to one embodiment, the ratio $u_1$ of the sum of the axial extension of the thread packets to the connection diameter may be $0.1 \leq u_1 \leq 0.3$. In particular, this ratio may be $0.12 \leq u_1 \leq 0.28$.

In addition, the elastic joint body may also have a predetermined ratio of the axial extension of the thread packets to the outer diameter of at least one collar element. The outer diameter of the collar element is determined by the extension of the radial section of the collar element; i.e., the outer circumferential edge of the radial section of the collar element specifies the outer diameter of the collar element. In particular, the outer diameter of an axially inner collar element may be used. This ratio of the sum of the axial extension of the thread packets $I_1, I_2, I_n$ to the outer diameter $d_n$ of at least one collar element is referred to below as the ratio $u_2$. The ratio $u_2$ may be $0.3 \leq u_2 \leq 1$. The ratio $u_2$ may preferably be $0.4 \leq u_2 \leq 0.9$. The ratio $u_2$ results from:

$$u_2 = \frac{l_1 + l_2 + \ldots + l_n}{d_n},$$

where once again $I_1, I_2, \ldots, I_n$ in each case refer to the axial extension of the thread packets, and $d_n$ refers to the outer diameter of the collar element in question. The outer diameter of a collar element having at least two sections extending in the radial direction may be used. The two radial sections of this type of collar element may have the same outer diameter, so that the outer diameter of one of the radial sections may be used. Such a collar element having two radial sections may be situated as an axially inner collar element.

The elastic joint body may also have a predetermined ratio of the axial extension of the support device to the outer diameter of a collar element. This ratio is referred to below as the ratio $u_3$. The ratio $u_3$ of the axial extension of the support device to the outer diameter of a collar element may be in a range of $0.6 \leq u_3 \leq 1.2$. In particular, the ratio $u_3$ may be in a range of $0.8 \leq u_3 \leq 1$. The axial extension of the support device results from the sum of the axial extension of the thread packets ($I_1, I_2, I_n$) and the thickness ($a_1, a_2, a_3, a_n$) of the radial sections of the collar elements. In this context, the term "thickness of the radial sections of the collar elements" is understood to mean the axial extension of the radial section of a collar element. The axial extension of each individual thread packet corresponds to the predetermined axial distance between two adjacent radial sections of one or more collar elements. The ratio $u_3$ results from:

$$u_3 = \frac{l_1 + l_2 + \ldots + l_n + a_1 + a_2 + a_3 + \ldots + a_n}{d_n}$$

The elastic joint body may have a predetermined ratio of the axial extension of the support device to the connection diameter LK. This ratio is referred to as the ratio $u_4$. The ratio $u_4$ results from:

$$u_4 = \frac{l_1 + l_2 + \ldots + l_n + a_1 + a_2 + a_3 + \ldots + a_n}{LK}$$

The axial extension of the support device once again results from the sum of the axial extension of the thread packets ($I_1, I_2, I_n$) and the thickness ($a_1, a_2, a_3, a_n$) of the radial sections of the collar elements. The ratio $u_4$ may be $0.1 \leq u_4 \leq 0.45$, preferably $0.15 \leq u_4 \leq 0.4$.

The axial extension of a thread packet with regard to the outer diameter of the collar element associated with this thread packet may likewise have a predetermined ratio. In particular, a predetermined ratio $u_5$ of the axial extension of a thread packet $I_n$ in the pulling segment to the outer diameter do of a collar element associated with this thread packet in the pulling segment may be present. The ratio $u_5$ may be $0.2 \leq u_5 \leq 0.6$. In particular, $u_5$ may be in a range of $0.25 \leq u_5 \leq 0.5$.

The object stated above may also be achieved according to the invention with an elastic joint body having the following features:
  a plurality of bushings, the center axes of the bushings lying on a circle about the center axis of the elastic joint body, and the diameter of this circle indicating the connection diameter of the elastic joint body,
  a plurality of thread packets for coupling at least two bushings, each thread packet having a predetermined axial extension,
  at least one support device for guiding the thread packets which has a plurality of collar elements, the plurality of collar elements including at least one collar element having at least two sections extending in the radial direction, and
  at least one elastic casing in which at least the thread packets and the at least one support device are at least partially embedded,
wherein the ratio $u_2$ of the sum of the axial extension of the thread packets to the outer diameter of at least one collar element is $0.4 \leq u_2 \leq 0.9$.

In addition, the above-stated object of the invention may be achieved with an elastic joint body having the following features:
  a plurality of bushings, the center axes of the bushings lying on a circle about the center axis of the elastic joint body, and the diameter of this circle indicating the connection diameter of the elastic joint body,
  a plurality of thread packets for coupling at least two bushings, each thread packet having a predetermined axial extension,
  at least one support device for guiding the thread packets which has a plurality of collar elements, the plurality of collar elements including at least one collar element having at least two sections extending in the radial direction, and
  at least one elastic casing in which at least the thread packets and the at least one support device are at least partially embedded,
wherein the ratio $u_3$ of the axial extension of the support device to the outer diameter of a collar element is $0.8 \leq u_3 \leq 1$, the axial extension of the support device corresponding to the sum of the axial extension of the thread packets and the thickness of the radial sections of the collar elements.

The present invention further relates to an elastic joint body having
  a plurality of bushings, the center axes of the bushings lying on a circle about the center axis of the elastic joint body, and the diameter of this circle indicating the connection diameter of the elastic joint body,
  a plurality of thread packets for coupling at least two bushings, each thread packet having a predetermined axial extension, at least one support device for guiding the thread packets which has a plurality of collar elements, the plurality of collar elements including at least one collar element having at least two sections extending in the radial direction, and at least one elastic casing in which at least the thread packets and the at least one support device are at least partially embedded, wherein the ratio $u_4$ of the axial extension of the support device to the connection diameter (LK) is $0.15 \leq u_4 \leq 0.4$, and the axial extension of the support device corresponds to the sum of the axial extension of the thread packets and the thickness of the radial sections of the collar elements.

To achieve the object of the invention, in addition an elastic joint body may be used, having a plurality of bushings, the center axes of the bushings lying on a circle about the center axis of the elastic joint body, the diameter of this circle indicating the connection diameter of the elastic joint body, at least one thread packet for coupling at least two bushings, each thread packet having a predetermined axial extension, at least one support device for guiding the thread packets which has a plurality of collar elements, the plurality of collar elements including at least one collar element having at least two sections extending in the radial direction, and at least one elastic casing in which at least the thread packets and the at least one support device are at least partially embedded, wherein the ratio us of the axial extension ($l_2$) of a thread packet in the pulling segment to the outer diameter ($d_2$) of a collar element associated with this thread packet is $0.25 \leq u_5 \leq 0.5$.

The at least one thread packet situated in the pulling segment may be accommodated in a collar element having at least two sections extending in the radial direction. This type of collar element may have a section, extending in the axial direction, which extends between the two radial sections. The collar element is fastened to the bushing via the axial section. The extension of the axial section of the collar element may be coordinated with the predetermined axial extension of the thread packet. The collar element may thus have a U-shaped cross section. The thread packet in the pulling segment may be accommodated in this collar element.

In addition, the at least one thread packet situated in the pushing segment may be accommodated in a collar element having at least two sections extending in the radial direction. This collar element may also have an axial section that is provided between the two radial sections. This collar element as well may thus have a U-shaped design. The U-shaped collar element may accommodate a thread packet in the pushing segment.

The at least one thread packet situated in the pushing segment may extend between the collar element, having two sections extending in the radial direction, and an axially outer collar element. The axially outer collar element may likewise be a collar element having two radial sections, in which a further thread packet is accommodated.

At least one thread packet may extend in the axial direction between two collar elements having at least two sections extending in the radial direction.

It is conceivable, for example, for further thread packets to be guided between the axially outer collar elements, having two radial sections, and a central collar element having two radial sections. These further thread packets may each rest against a radial section of two different collar elements.

According to one embodiment, the axially outer collar elements may have an axial section that extends beyond a radial section of the collar element. For a collar element having two radial sections, the axial section may extend in the axial direction, beyond one of the two radial sections. For example, this type of collar element may be situated on the bushings in such a way that the axial section protrudes beyond one of the radial sections in the direction of one end of the bushings.

In addition, a predetermined ratio of the axial extension of a thread packet in the pulling segment to the axial extension of a thread packet in the pulling segment may be present. This ratio is referred to as the ratio $u_6$. The ratio $u_6$ may be in a range of $0.1 \leq u_6 \leq 0.6$. In particular, the ratio $u_6$ may be 0.5. This means that the thread packet in the pulling segment has a larger cross section than the thread packet in the pushing segment. Thread packets in the pulling segment absorb greater forces in the pulling mode of the elastic joint body than does the thread packet in the pushing segment. The thread packets in the pushing segment are subjected to tension in the pushing mode of the elastic joint body, for example when a motor vehicle is traveling in reverse, when the elastic joint body is situated in the drive train of a vehicle.

In addition, there may be a predetermined ratio of the radial extension of a collar element to the axial extension of a thread packet associated with this collar element. The radial extension of a collar element results from the difference between the outer diameter of the collar element and the inner diameter of an opening of the collar in which a bushing may be accommodated in sections. The radial extension of the collar element may also be determined from the sum of the thickness b of the axial section of the collar element and the radial extension h of the radial section, starting from the axial section of the collar element. This ratio is referred to as $u_7$. The ratio $u_7$ may be in a range of $0.8 \leq u_7 \leq 2.0$. The ratio $u_7$ results from $$u_7 = \frac{h_n + b_n}{l_n},$$

where $h_n$ refers to the radial extension of the radial section of the particular collar element, $b_n$ refers to the thickness, i.e., the material thickness, of the axial section of the particular collar element, and $l_n$ refers to the axial extension of the thread packet associated with this collar element. The radial extension of the radial section of a collar element may essentially correspond to the radial extension of a thread packet when the thread packet rests against the bushing or an axial section of the collar element.

If a collar element having two radial sections and an axial section extending between these radial sections, i.e., a collar element having a U-shaped cross section, for accommodating the thread packet in the pulling segment is provided, the thickness a of the radial sections may be greater than or equal to the thickness b of the axial sections. Accordingly, $a_n \leq b_n$ may apply. The thickness a may be 1.2 mm.

A collar element having a U-shaped cross section may be made of steel. The U-shaped collar element may also be manufactured by sintering, extrusion, bending high-strength steel, and rolling.

According to one embodiment, the outer diameter $d_{Bai}$ of at least one axially inner collar element may be larger than the outer diameter of the at least one axially outer collar element $d_{Baa}$. Thus, $d_{Bai} > d_{Baa}$ may apply. In other words, the radial section of the axially inner collar element may protrude beyond the radial section of the axially outer collar element in the radial direction. Due to this ratio, the service life of the elastic joint body may be further increased under loads at a bending angle. The axially inner collar element may be a collar element having two sections extending in the radial direction. For an axially inner collar element having two sections extending in the radial direction, the outer diameters of the two radial sections are usually equal. The outer diameter of such a collar element may be determined, starting from the outer circumferential edge of one of the two radial sections. For determining the outer diameter of such a collar element, it is thus sufficient to use the outer diameter of one of the two radial sections.

The present invention further relates to an elastic joint body for a shaft arrangement for the articulated connection of two shaft sections, having
- a plurality of bushings, the center axes of the bushings lying on a circle about the center axis of the elastic joint body, and the diameter of this circle indicating the connection diameter of the elastic joint body,
- a plurality of thread packets, each thread packet having a predetermined axial extension,
- at least one support device for guiding the thread packets which has a plurality of collar elements, and
- at least one elastic casing in which at least the thread packets and the at least one support device are at least partially embedded, wherein the outer diameter of at least one axially inner collar element is larger than the outer diameter of the at least one axially outer collar element.

Due to this ratio, an elastic joint body having a compact design is achieved, which still has a high power density and thus also a long service life. In elastic joint bodies, the axially inner collar elements are frequently associated with a thread packet in the pulling segment. Thread packets in the pulling segment are subjected to relative heavy load in the pulling mode of the elastic joint body. Due to the larger outer diameter of the axially inner collar elements, or of the axially inner collar element compared to the outer diameter of the axially outer collar element, the thread packet in the pulling segment may have a larger cross section, in particular in the radial direction of the collar elements, than the thread packets in the pushing segment, as the result of which the service life of the elastic joint body, in particular under loads at a bending angle, may be increased. A bending angle is present when the shafts to be connected via the elastic joint body are angularly offset relative to one another. The axially inner collar element may be a collar element having two sections extending in the radial direction. However, it is also conceivable to use collar elements that are disk-shaped or that have an L-shaped cross section as radial inner collar elements. In these cases, two collar elements may be associated in each case with the thread packet situated in the pulling segment.

The elastic body may be made, for example, of an elastomer, a thermoplastic elastomer, a silicone, or also rubber. A thread packet is understood to mean a tab-shaped element that is formed by a plurality of thread windings. An individual thread or also multiple threads may be wound in a tab shape. The threads of the thread packets may be connected to one another.

Exemplary embodiments of the invention are described below with reference to the appended figures, which illustrate the following:

FIG. 1 shows a top view of an elastic joint body according to a first embodiment of the invention;

FIG. 2 shows a sectional view of an elastic joint body according to a first embodiment of the invention;

FIG. 4 shows a top view of an elastic joint body according to a second embodiment of the invention;

FIG. 5 shows a sectional view of an elastic joint body according to the second embodiment of the invention;

FIG. 6 shows a top view of an elastic joint body according to a third embodiment of the invention;

FIG. 7 shows a sectional view of an elastic joint body according to the third embodiment of the invention;

FIG. 10 shows a top view of an elastic joint body according to a fifth embodiment of the invention;

FIG. 11 shows a sectional view of an elastic joint body according to the fifth embodiment of the invention;

FIG. 12 shows a top view of an elastic joint body according to a sixth embodiment of the invention;

FIG. 13 shows a sectional view of an elastic joint body according to the sixth embodiment of the invention;

FIG. 14 shows a top view of an elastic joint body according to a seventh embodiment of the invention;

FIG. 15 shows a sectional view of an elastic joint body according to the seventh embodiment of the invention;

FIG. 18 shows a top view of a fiber-reinforced elastic joint body according to a ninth embodiment of the invention; and FIG. 19 shows a sectional view of a fiber-reinforced elastic joint body according to the ninth embodiment of the invention.

FIG. 1 shows a top view of an elastic joint body, denoted overall by reference numeral 10.

Figure 3:
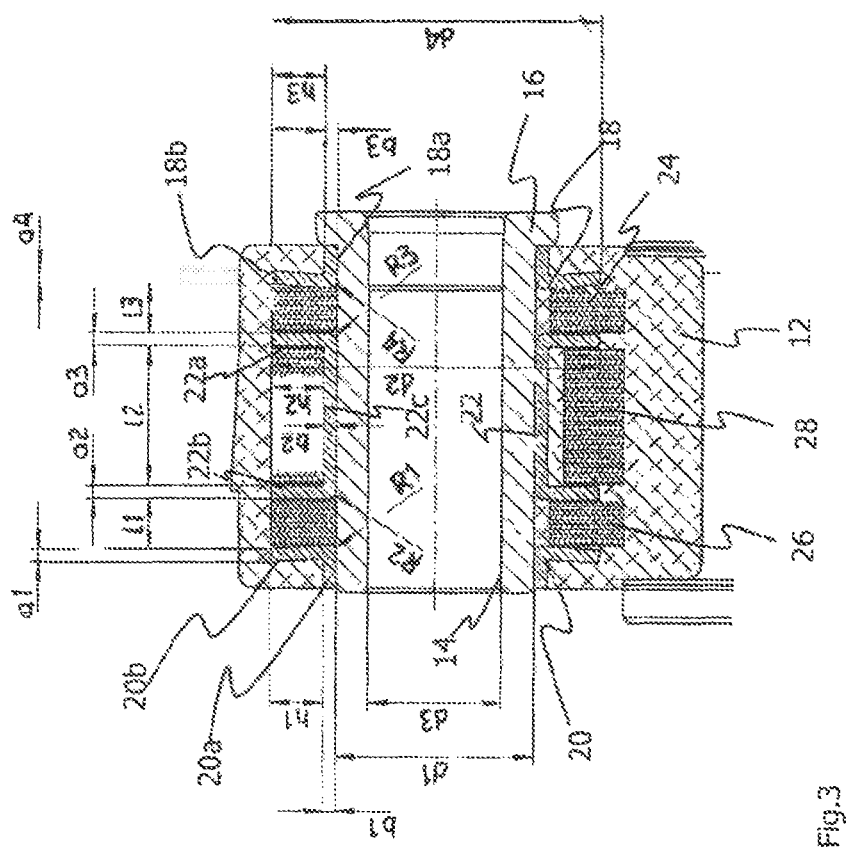
FIG. 3 shows in enlarged detail the sectional view of FIG. 2 according to the first embodiment of the invention.

The elastic joint body 10 has an elastic body 12 and bushings 14. The bushings 14 have a flange-like head 16 at one of their ends. The respective other end of the bushings is designed without such a head. At the axial surface of the elastic joint body shown in FIG. 1, the bushings 14 are situated with their end having the head 16 in alternation with their respective other end (without a head) in the circumferential direction of the elastic joint body 10. Collar elements 18 are discernible at the ends without a head. The collar elements 18 and the bushings 14 are at least partially embedded in the elastic body 12.

The center axis of the elastic joint body 10 is denoted by reference character $M_G$, and the center axis of the bushings is denoted by reference character $M_B$. When reference is made below to an axial direction or axial position, these statements always refer to the axial extension of one or both axes $M_G$ and $M_B$.

The center axes $M_B$ of all bushings 14 lie on an imaginary circle K about the center axis $M_G$ of the elastic joint body 10. In other words, the center axes $M_B$ of the bushings 14 all lie on a radius about the center axis $M_G$ of the elastic joint body 10. The diameter of this imaginary circle K corresponds to the connection diameter LK.

FIG. 2 shows a sectional view along the section line II-II in FIG. 1.

In addition to the collar element 18 already shown in FIG. 1, collar elements 20 and 22 are also situated on the bushings 14. The collar elements 18, 20, and 22 form a support device for axially supporting and guiding thread packets 24, 26, 28, respectively. The collar elements 18 and 20 are situated at the axial end sections of the bushings 14. The collar element 22 is situated between the collar elements 18 and 20. The collar elements 18 and 20 thus form axially outer collar elements. The collar element 22 represents an axially inner collar element.

The axially outer collar elements 18 and 20 are designed as L-shaped collars. The collar elements 18 and 20 accordingly have an axial section 18a and 20a, respectively, that rests against the bushings 14. The sections 18a and 20a have a tubular design. The axial end-face sides of these tubular sections 18a and 20a face in the direction of the axial ends of the bushings 14. The head 16 of the bushing 14 rests against the end-face side of the section 18a of the collar element 18. The collar elements 18 and 20 likewise have radial sections 18b and 20b in addition to the axial sections 18a and 20a. The radial sections 18b and 20b extend outwardly in the radial direction, starting from the axial sections 18a and 20a.

The axially inner collar element 22 has a U-shaped cross section. The collar element 22 has two radial sections 22a and 22b. An axial section 22c, which connects the two radial sections 22a and 22b to one another, extends between the two radial sections 22a and 22b. The collar element 22 accommodates the thread packet 28. The distance between the radial sections 22a and 22b corresponds to the axial extension of the thread packet 28. The thread packet 28 is situated in a pulling segment of the elastic joint body 10, and is thus subjected to tension in the pulling mode of the elastic joint body 10.

The thread packets 24 and 26 are situated in a pushing segment that is subjected to tension in the pushing mode of the elastic joint body 10. Since lower loads occur in the pushing mode of the elastic joint body 10, the thread packets 24 and 26 in total have a smaller cross section than the thread packet 28. The thread packets 24 and 26 are guided between the radial sections 22a and 22b of the collar element 22 and the radial sections 18b and 20b of the collar elements 18 and 20. The axial distance between the radial sections 18b, 20b, 22a, and 22b thus determines the cross section of the thread packets 24 and 28.

In contrast to the thread packet 28, the thread packets 24 and 26 rest, at least in sections, directly against the outer circumferential surface of the bushing 14. The thread packet 28 rests only against the collar element 22, and therefore does not come into contact with the bushing 14.

FIG. 3 shows an enlarged detail of the sectional view according to FIG. 2. Various dimensions of the components of the elastic joint body 10 are provided in the view according to FIG. 3.

The provided dimensions refer to the individual elements of the elastic joint body 10, as follows:

a1: thickness (extension in the direction of the center axis $M_B$ of the bushing 14) of the radial section 20b of the collar element 20;
a2: thickness (extension in the direction of the center axis $M_B$ of the bushing 14) of the radial section 22b of the collar element 22;
a3: thickness (extension in the direction of the center axis $M_B$ of the bushing 14) of the radial section 22a of the collar element 22;
a4: thickness (extension in the direction of the center axis $M_B$ of the bushing 14) of the radial section 18b of the collar element 18;
b1: thickness (extension in the radial direction) of the axial section 20a of the collar element 20;
b2: thickness (extension in the radial direction) of the axial section 22c of the collar element 22;
b3: thickness (extension in the radial direction) of the axial section 18a of the collar element 18;
h1: radial extension of the radial section 20b of the collar element 20, starting from the axial section 20a;
h2: radial extension of the radial sections 22a and 22b of the collar element 22, starting from the axial section 22c;
h3: radial extension of the radial section 18b of the collar element 18, starting from the axial section 18a;
I1: axial extension of the thread packet 26;
I2: axial extension of the thread packet 28;
I3: axial extension of the thread packet 24;
d1: outer diameter of the bushing 14;
d2: outer diameter of the radial sections 22a and 22b of the collar element 22;
d3: inner diameter of the bushing 14;
d4: outer diameter of the radial sections 18b and 20b of the collar elements 18 and 20;
LK: diameter of the circle on which the center axes $M_B$ of the bushings 14 lie, the diameter of this circle indicating the connection diameter of the elastic joint body 10; and
R1, R2, R3, R4 predetermined radii of the transitions between the axial sections 18a, 20a, and 22c into the radial sections 18b, 20b, 22a, and 22b of the collar elements 18, 20, 22.

The ratios of the joint body described above may be indicated, based on these dimensions.

The ratio $u_1$ may thus be determined from:

$$u_1 = \frac{l_1 + l_2 + l_3}{LK}$$

The sum of the axial extension $I_1$, $I_2$, $I_3$ may be 22 mm, for example. The connection diameter LK may be 110 mm, for example. This results in a value of 0.2 for the ratio $u_1$.

The ratio $u_2$ may be determined from:

$$u_2 = \frac{l_1 + l_2 + l_3}{d_2}$$

The outer diameter $d_2$ of the radial sections 22a and 22b of the collar element 22 is preferably used for the ratio $u_2$. The outer diameter $d_2$ of the radial sections 22a and 22b may be 30 mm, for example. A value of 0.7 may result for the ratio $u_2$.

The ratio $u_3$ results from:

$$u_3 = \frac{l_1 + l_2 + l_3 + a_1 + a_2 + a_3 + a_4}{d_2}$$

The outer diameter $d_2$ of the radial sections 22a and 22b of the axially inner collar element 22 is also used for the ratio $u_3$. Once again, the value of 22 mm by way of example is used for the axial extension of the thread packets 24, 26, 28. The thickness of the radial sections 18b, 20b, 22a, and 22b may be assumed to be 1 mm. The outer diameter of $d_2$ is once again assumed to be 30 mm. Based on these values, a value of 0.87 then results for the ratio $u_3$.

The ratio $u_4$ may be determined from:

$$u_4 = \frac{l_1 + l_2 + l_3 + a_1 + a_2 + a_3 + a_4}{LK}$$

Based on the values given above, this results in a value of 0.24 for the ratio $u_4$.

The ratio $u_5$ may be determined from:

$$u_5 = \frac{l_2}{d_2}$$

A value of 12 mm may be assumed for the axial extension 12 of the thread packet 28. A value of 0.4 may result for the ratio $u_5$, with an outer diameter $d_2$ of the radial sections 22a and 22b of the collar element 22 of 30 mm.

The ratio $u_6$ may be determined from:

$$u_6 = \frac{l_1}{l_2}$$

In other words, the elastic joint body 10 according to the invention may have a predetermined ratio of the axial extension 12 of the thread packet 28 in the pulling segment to the axial extension $I_1$ of a thread packet 24 or 26 in the pushing segment. A value of 5 mm may be assumed for the axial extension $I_1$ of a thread packet 24 or 26 in the pushing segment, and a value of 12 mm may be assumed for the axial extension 12 of the thread packet 28 in the pulling segment. This results in a value of 0.42 for the ratio $u_6$.

The ratio $u_7$ results from the following equation:

$$u_7 = \frac{h_1 + b_1}{l_1}$$

b1 indicates the thickness (extension in the radial direction) of the axial section 20a of the collar element 20. h1 indicates the radial extension of the radial section 20b of the collar element 20, starting from the axial section 20a. b1 may be assumed to be 1 mm, and h1 may be assumed to be 5 mm. The axial extension $I_1$ of the thread packet 26 is once again assumed to be 5 mm. This results in a value of 1.2 for the ratio $u_7$.

In addition, the outer diameter d2 of the radial sections 22a and 22b may be larger than the outer diameter d4 of one of the radial sections 18b and 20b of one of the collar elements 18 and 20. Accordingly, $d_2 > d_4$ may apply (as shown in FIG. 5).

The ratios and equations discussed above may be adapted to the embodiments described below, whereby values that lie within the ranges stated above also result for the ratios $u_1$ through $u_7$ for the embodiments described below.

FIG. 4 shows a top view of an elastic joint body 110 according to a second embodiment of the invention.

The joint body 110 has an elastic body 12 and bushings 14. Collar elements 18 are provided at the bushings 14. The bushings 14 have a head 16 at their ends.

FIG. 5 shows a sectional view along the section line V-V in FIG. 4.

The elastic joint body 110 has two collar elements 18 and 20. The collar elements 18 and 20 have radial sections 18a, 18b, 20a, 20b and axial sections 18c and 20c, 18d and 20d. The axial sections 18c and 20c extend via section 18d and 20d beyond the axially outer radial section 18b and 20b in the axial direction. The sections 18d and 20d face in the direction of the axial ends of the bushings 14. The sections 18d and 20d thus extend between the end of the bushings and the axially outer radial section 18b and 20b. The radial sections 18a, 18b and 20a, 20b together with the axial sections 18c and 20c form a U-shaped area of the collar elements 18 and 20 in which the thread packets 18 and 20 are accommodated. The thread packet 28 is guided in the pulling segment, between the axially inner radial sections 18a and 20a. Thus, no additional axially inner collar element is provided in this embodiment.

FIG. 6 shows a top view of an elastic joint body 210 according to a third embodiment of the invention.

The top view of the elastic joint body 210 corresponds to the top view of the elastic joint body 110, which has already been described in detail above.

The essential difference between the embodiment shown in FIGS. 4 and 5 and the embodiment according to FIGS. 6 and 7 lies in the arrangement of an additional axially inner collar element 22. The collar element 22 has a U-shaped cross section and accommodates the thread packet 28. The axially outer collar elements 18 and 20 correspond to the collar elements 18 and 20 described with reference to FIGS. 4 and 5. The radial sections 22a and 22b of the axially inner collar element 22 rest against the radial sections 18a and 20a. The thread packet 28 is thus separated from the thread packet 24 by the radial sections 18a and 22a of the collar elements 18, 20, and is separated from the thread packet 26 by the radial sections 20a and 22b of the collar elements 18, 20.

In the elastic joint body 110, the thread packets 24, 26, 28 may be directly wound into their associated U-shaped collar elements 18, 20, and 22. The collar elements 18, 20, 22 and the thread packets 24, 26, 28 wound into the collar elements 18, 20, 22 may subsequently be fitted or pressed onto the bushings 14.

Figure 8:
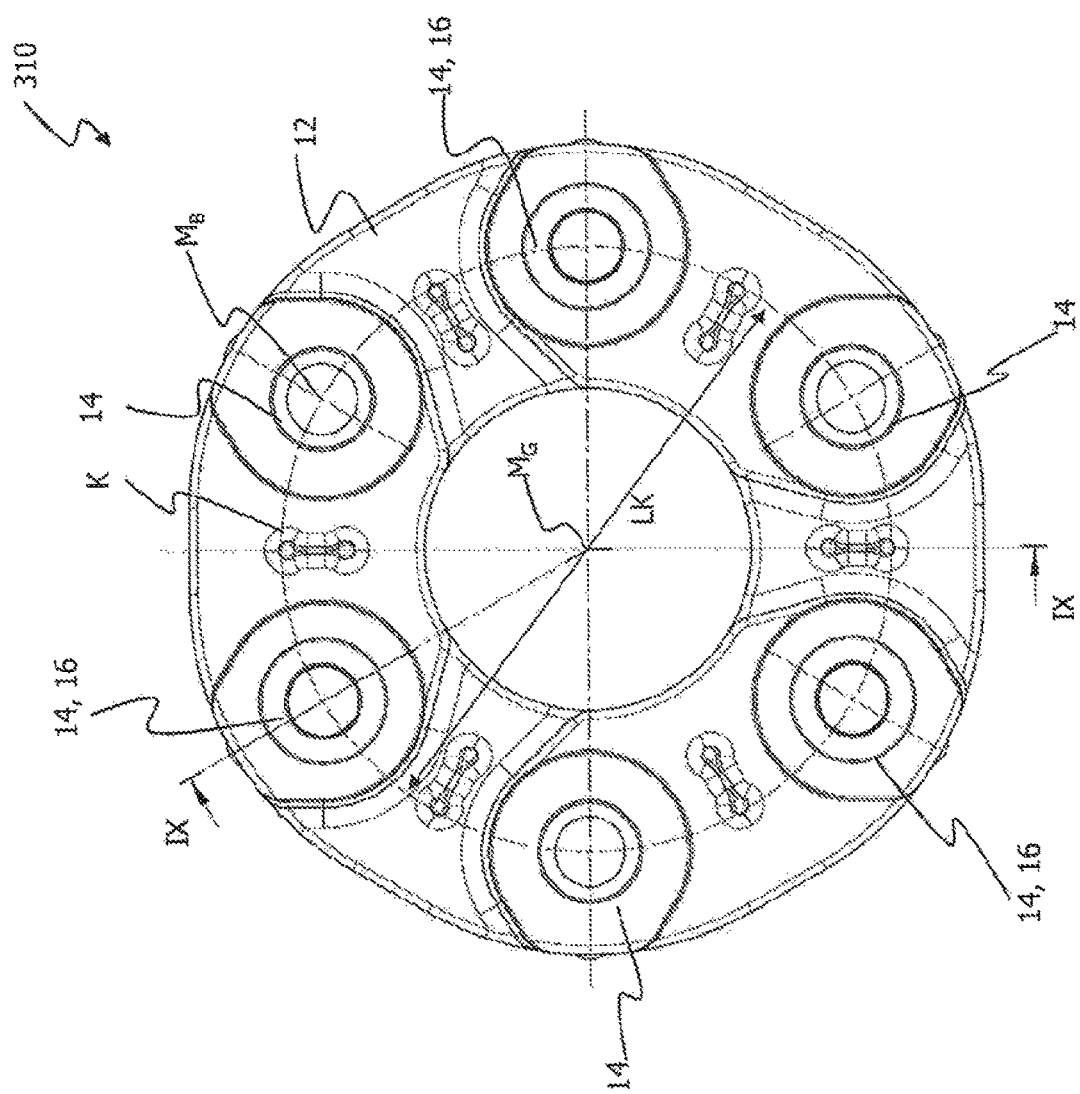
FIG. 8 shows a top view of an elastic joint body according to a fourth embodiment of the invention.

FIG. 8 shows a top view of an elastic joint body 310 according to a fourth embodiment of the invention.

The elastic joint body 310 has an elastic casing 12 or an elastic body 12, and bushings 14. Collar elements are not discernible at the surface of the elastic joint body 310.

Figure 9:
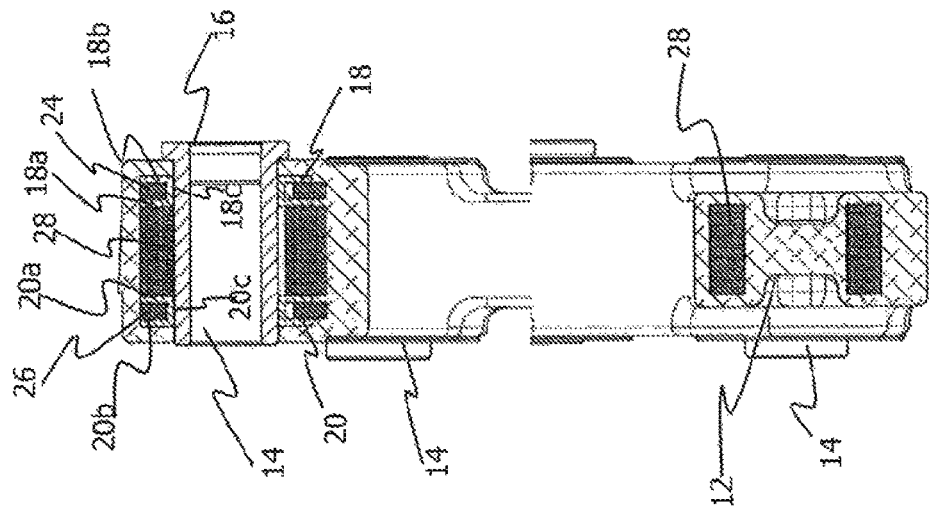
FIG. 9 shows a sectional view of an elastic joint body according to the fourth embodiment of the invention.

FIG. 9 shows a sectional view along the section line IX-IX in FIG. 8.

The elastic joint body 310 has two collar elements 18 and 20 having a U-shaped cross section. The collar elements 18 and 20 accommodate a thread packet 24, 26, respectively. The collar elements 18 and 20 guide the thread packet 28 in the pulling segment, between their oppositely situated radial sections 18a and 20a. The thread packet 28 thus extends axially within the radial sections 18a and 20a. Thus, no separate axially inner collar element for guiding the thread packet 28 is provided.

The fifth embodiment shown in FIGS. 10 and 11 largely corresponds to the embodiments described with reference to FIGS. 8 and 9. FIG. 10 shows a top view of the elastic joint body 410, and FIG. 11 shows a sectional view along the section line XI-XI in FIG. 10.

The only difference from the embodiment according to FIGS. 8 and 9 is the axially inner collar element 22. The axially inner collar element 22 has a U-shaped cross section, and has already been described in detail above. According to this embodiment, three collar elements 18, 20, 22 having two respective radial sections 18a, 18b, 20a, 20b, 22a, 22b are thus provided. The radial sections 18a and 22a of the collar elements 18 and 22 rest against one another. The same applies for the radial sections 20a and 22b, which likewise rest against one another. The axial sections 18c, 20c, and 22c of the collar elements 18, 20, 22 rest against the outer circumferential surface of the bushing 14.

FIG. 12 shows a top view of an elastic joint body 510 according to a sixth embodiment of the invention.

The elastic joint body 510 has an elastic body 12 in which bushings 14 are accommodated.

FIG. 13 shows a sectional view along the section line XIII-XIII in FIG. 12.

The elastic joint body 510 according to the sixth embodiment has five thread packets 24, 26, 28, 30, 32. The thread packets 24, 26, 28, 30, 32 have the same cross section; i.e., their extensions in the radial direction and in the axial direction are equal. The thread packets 24, 26, 28, 30, 32 are accommodated in five U-shaped collar elements 18, 20, 22, 34, 36. The individual radial and axial sections of the collar elements 20, 22, 34 and 36 are not provided with reference numerals in FIG. 13 for reasons of clarity. Since the collar elements 18, 20, 22, 34, 36 all have essentially the same design, only the collar element 18 is described by way of example. The collar element 18 has two radial sections 18a and 18b, which are connected to one another via an axial section 18c. The thread packet 24 is accommodated between the radial sections 18a and 18b. The cross section of the thread packet 24 is adapted to the distance between the radial sections 18a and 18b of the collar elements 18, so that the thread packet 24 may be completely accommodated in the collar element 18.

The thread packets 24, 28, 32 are subjected to tension in the pulling mode of the elastic joint body 610. The thread packets 26, 30, situated between the thread packets 24, 28, and 30, are subjected to tension in the pushing mode of the elastic joint body.

The thread packets 24, 26, 28, 30, 32 all have the same cross section. The thread packets 24, 26, 28, 30, 32 are separated from one another in the axial direction by two radial sections of the collar elements 18, 20, 22, 34, 36 in each case.

FIG. 14 shows a top view of an elastic joint body 610 according to a seventh embodiment of the invention.

The elastic joint body 610 has an elastic body 12, and bushings 14 that are accommodated in the elastic body 12, offset relative to one another in the circumferential direction.

FIG. 15 shows a sectional view along the section line XV-XV in FIG. 14.

The elastic joint body 610 has three collar elements 18, 22, 36 in which the thread packets 24, 28, and 32, respectively, are accommodated. The collar elements 18, 22, 36 have identical cross sections. The collar elements 18, 22, 36 have a U-shaped cross section. Thus, the collar elements 18, 22, 36 each have two radial sections, and an axial section that connects the two radial sections. This is indicated by sections 18a, 18b, and 18c of the collar element 18, which are provided with reference numerals by way of example. The collar element 18 has two radial sections 18a and 18b that are connected via an axial section 18c. The collar elements 22 and 36 have the same design and construction as the collar element 18. The collar elements 18, 22, 36 rest with their axial section against the outer circumferential surface of the bushings 14.

The thread packets 26 and 30 are supported and axially guided by oppositely situated radial sections of the collar elements 18, 22, and 36. Thus, the thread packets 26 and 30 are not accommodated in a separate collar element.

The thread packets 26 and 30 thus rest, in sections, directly against the outer circumferential surface of the bushings 14.

Figure 16:
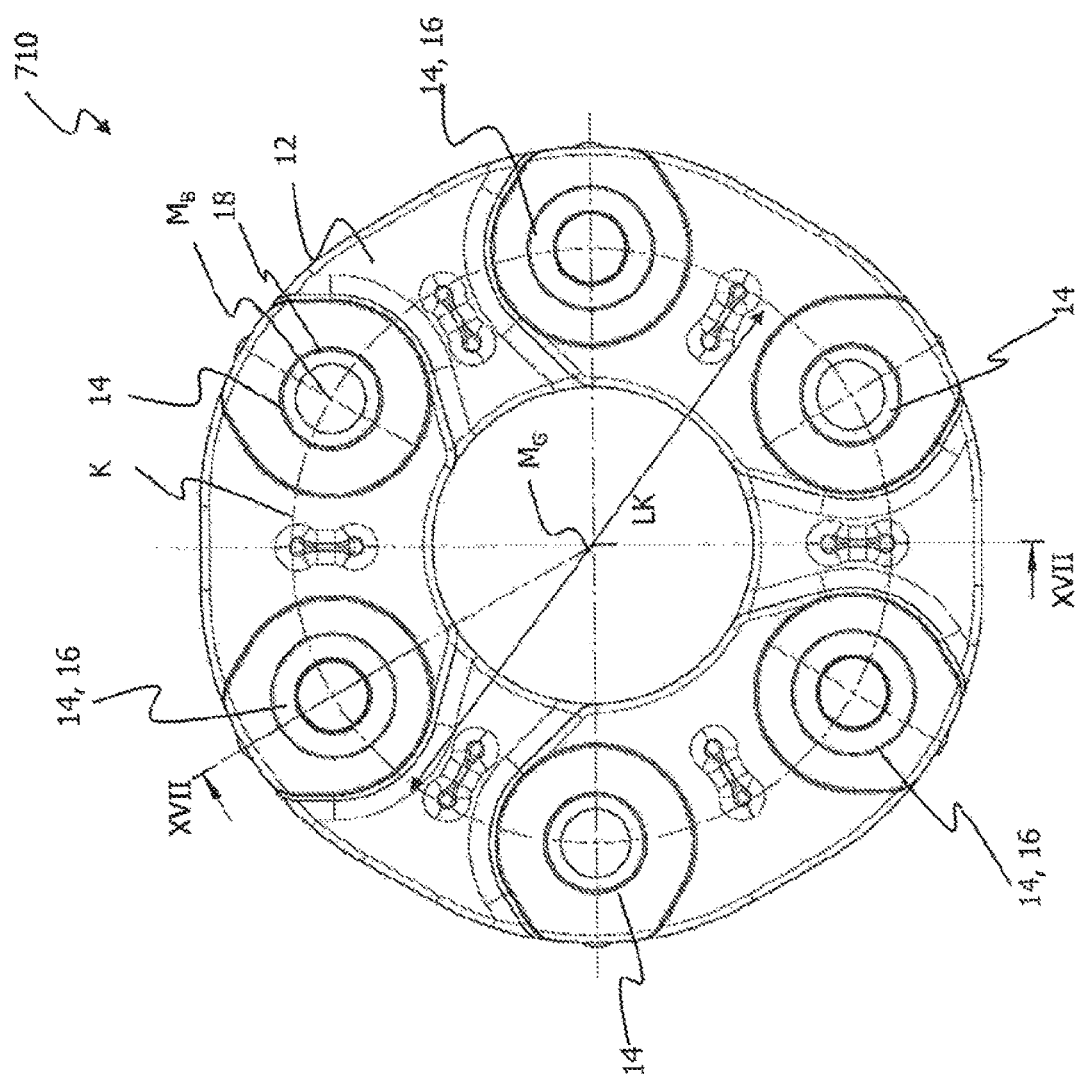
FIG. 16 shows a top view of an elastic joint body according to an eighth embodiment of the invention.

FIG. 16 shows a top view of an elastic joint body 710 according to an eighth embodiment of the invention.

The elastic joint body 710 has bushings 14 that are accommodated in an elastic body 12.

Figure 17:
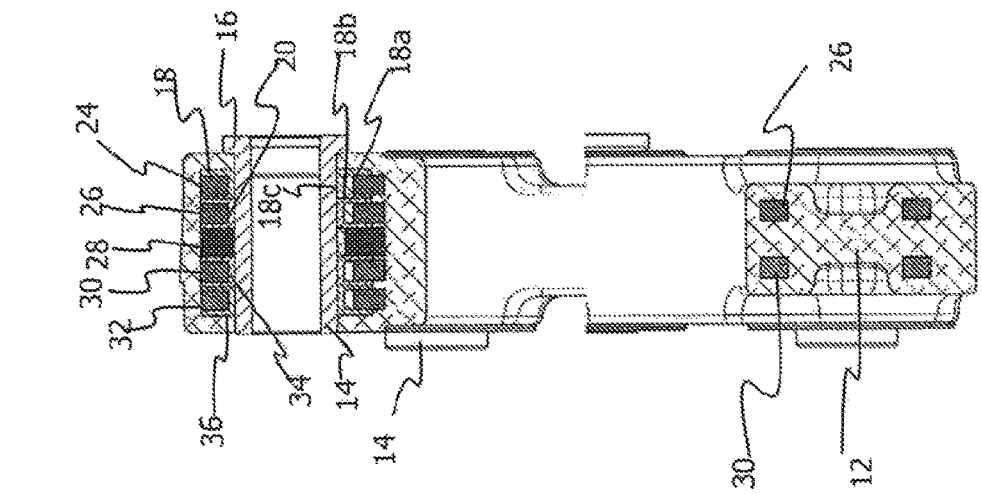
FIG. 17 shows a sectional view of an elastic joint body according to the eighth embodiment of the invention.

FIG. 17 shows a sectional view along the section line XVII-XVII in FIG. 16.

The elastic joint body 710 has four U-shaped collar elements 18, 20, 34, and 36. The collar elements 18, 20, 34, and 36 accommodate a thread packet 24, 26, 30, and 32, respectively, in their U shape. Another thread packet 28 having a larger cross section than the thread packets 24, 26, 30, and 32 is provided between the collar elements 20 and 34. The thread packet 28 rests, at least in sections, directly against the outer circumferential surface of the bushings 14. The thread packet 28 is guided by oppositely situated radial sections of the collar elements 20 and 34. The thread packet 28 and the thread packets 24 and 32 are situated in a pulling segment of the elastic joint body 710. The thread packets 26 and 30 are situated in a pushing segment of the elastic joint body 710.

The collar elements 18, 20, 34, and 36 have designs that are identical to the U-shaped collar elements described above. The collar elements 18, 20, 34, and 36 have an identical design; i.e., the radial sections and axial sections of each of the collar elements 18, 20, 34, and 36 are identical in their extensions.

FIG. 18 shows a top view of a fiber-reinforced elastic joint body 810 according to a ninth embodiment of the invention.

The fiber-reinforced elastic joint body 810 is less circular than the joint body described above. The basic shape of the fiber-reinforced elastic joint body 810 corresponds to a polygon.

The fiber-reinforced elastic joint body 810 has an elastic body 12, and bushings 14 that are accommodated in the elastic body 12. The bushings 14 have a tubular design.

FIG. 19 shows a sectional view along the section line XIX-XIX in FIG. 18.

The fiber-reinforced elastic joint body 810 has two U-shaped collar elements 18 and 20. The elastic joint body 810 also has two thread packets 24 and 26. The thread packet 24 is accommodated in the collar element 18. The thread packet 26 is accommodated in the collar element 20. The thread packet 24 is situated in a pulling segment, and therefore has a larger cross section than the thread packet 26, situated in a pushing segment of the fiber-reinforced elastic joint body 810.

The collar elements 18 and 20 have two radial sections 18a, 18b and 20a, 20b, respectively. The radial sections 18a, 18b and 20a, 20b are connected to one another via an axial section 18c and 20c, respectively. The axial section 18c of the collar element 18 is longer in the axial direction than is the axial section 20c of the collar element 20. Since the thread packet 24 has a larger cross section, the collar element 18 associated with this thread packet 24 must also be larger than the collar element 20. However, the extensions of the radial sections 18a, 18b and 20a, 20b of the two collar elements 18 and 20 are identical, so that the only difference lies in the axial extension of the axial sections 18c and 20c. The collar elements 18 and 20 in their extensions in the radial and axial direction are coordinated with the predetermined cross section of the thread packets 24 and 26.

The invention claimed is:

1. An elastic joint body for a shaft arrangement for the articulated connection of two shaft sections, having
a plurality of bushings, the center axes of the bushings lying on a circle about the center axis of the elastic joint body, and a diameter of the circle indicating a connection diameter of the elastic joint body,
a plurality of thread packets for coupling at least two bushings, each thread packet having a predetermined axial extension,
at least one support device for guiding the thread packets which has a plurality of collar elements, the plurality of collar elements including at least one collar element having at least two sections extending in a radial direction, and
at least one elastic casing in which the thread packets and the at least one support device are at least partially embedded,
wherein a ratio $u_1$ of a sum of the axial extension of the thread packets to the connection diameter is $0.05 \le u_1 \le 0.35$.

2. The elastic joint body according to claim 1,
wherein the ratio $u_1$ of the sum of the axial extension of the thread packets to the connection diameter is $0.1 \le u_1 \le 0.3$.

3. The elastic joint body according to claim 1,
wherein the ratio $u_2$ of the sum of the axial extension of the thread packets to the outer diameter of at least one collar element is $0.3 \le u_2 \le 1$.

4. The elastic joint body according to claim 1,
wherein the ratio $u_3$ of the axial extension of the support device to the outer diameter of a collar element is $0.6 \le u_3 \le 1.2$, and the axial extension of the support device corresponds to the sum of the axial extension of the thread packets and the thickness of the radial sections of the collar elements.

5. The elastic joint body according to claim 1,
wherein the ratio $u_4$ of the axial extension of the support device to the connection diameter is $0.1 \le u_4 \le 0.45$, and the axial extension of the support device corresponds to the sum of the axial extension of the thread packets and the thickness of the radial sections of the collar elements.

6. The elastic joint body according to claim 1,
wherein the ratio $u_5$ of the axial extension of a thread packet in a pulling segment to the outer diameter of a collar element associated with this thread packet is $0.2 \le u_5 \le 0.6$.

7. The elastic joint body according to claim 1,
wherein at least one thread packet situated in a pulling segment is accommodated in the collar element having at least two sections extending in the radial direction.

8. The elastic joint body according to claim 1,
wherein at least one thread packet situated in a pushing segment is accommodated in the collar element having at least two sections extending in the radial direction.

9. The elastic joint body according to claim 1,
wherein at least one thread packet situated in a pushing segment extends between the collar element having at least two sections extending in the radial direction and an axially outer collar element.

10. The elastic joint body according to claim 9,
wherein the axially outer collar elements have an axial section that extends beyond a radial section of a collar element in the direction of the axial ends of one of the plurality of bushings.

11. The elastic joint body according to claim 1,
wherein at least one thread packet extends in an axial direction between two collar elements having at least two sections extending in the radial direction.

12. The elastic joint body according to claim 1,
wherein the ratio $u_6$ of the axial extension of at least one thread packet in the pulling segment to the axial extension of at least one thread packet in a pushing segment is $0.4 \le u_6 \le 0.6$.

13. The elastic joint body according to claim 1,
wherein the outer diameter of at least one axially inner collar element is larger than the outer diameter of at least one axially outer collar element.

14. The elastic joint body according to claim 1, wherein the elastic joint body is further defined as a fiber-reinforced elastic body joint.

15. An elastic joint body for a shaft arrangement for the articulated connection of two shaft sections, having
a plurality of bushings, the center axes of the bushings lying on a circle about the center axis of the elastic joint body, and a diameter of the circle indicating a connection diameter of the elastic joint body,
a plurality of thread packets for coupling at least two bushings, each thread packet having a predetermined axial extension,
at least one support device for guiding the thread packets which has a plurality of collar elements, the plurality of collar elements including at least one collar element having at least two sections extending in a radial direction, and
at least one elastic casing in which at least the thread packets and the at least one support device are at least partially embedded,
wherein a ratio $u_2$ of a sum of the axial extension of the thread packets to the outer diameter of at least one collar element is $0.3 \le u_2 \le 1$.

16. An elastic joint body for a shaft arrangement for the articulated connection of two shaft sections, having
a plurality of bushings, the center axes of the bushings lying on a circle about the center axis of the elastic joint body, and a diameter of the circle indicating a connection diameter of the elastic joint body,
a plurality of thread packets for coupling at least two bushings, each thread packet having a predetermined axial extension,
at least one support device for guiding the thread packets which has a plurality of collar elements, the plurality of collar elements including at least one collar element having at least two sections extending in a radial direction, and
at least one elastic casing in which the thread packets and the at least one support device are at least partially embedded,
wherein a ratio $u_3$ of an axial extension of the support device to an outer diameter of a collar element is $0.6 \le u_3 \le 1.2$, and the axial extension of the support device corresponds to a sum of the axial extension of the thread packets and a thickness of radial sections of the collar elements.

17. An elastic joint body for a shaft arrangement for the articulated connection of two shaft sections, having
a plurality of bushings, the center axes of the bushings lying on a circle about the center axis of the elastic joint body, and a diameter of the circle indicating a connection diameter of the elastic joint body,
a plurality of thread packets for coupling at least two bushings, each thread packet having a predetermined axial extension, at least one support device for guiding the thread packets which has a plurality of collar elements, the plurality of collar elements including at least one collar element having at least two sections extending in a radial direction, and at least one elastic casing in which the thread packets and the at least one support device are at least partially embedded, wherein a ratio $u_4$ of an axial extension of the support device to the connection diameter is $0.1 \leq u_4 \leq 0.45$, and the axial extension of the support device corresponds to a sum of the axial extension of the thread packets and a thickness of radial sections of the collar elements.

18. An elastic joint body for a shaft arrangement for the articulated connection of two shaft sections, having a plurality of bushings, the center axes of the bushings lying on a circle about the center axis of the elastic joint body, and a diameter of the circle indicating a connection diameter of the elastic joint body, a plurality of thread packets for coupling at least two bushings, each thread packet having a predetermined axial extension, at least one support device for guiding the thread packets which has a plurality of collar elements, the plurality of collar elements including at least one collar element having at least two sections extending in a radial direction, and at least one elastic casing in which at least the thread packets and the at least one support device are at least partially embedded, wherein a ratio $u_5$ of the axial extension of a thread packet in a pulling segment to an outer diameter of a collar element associated with the thread packet is $0.2 \leq u_5 \leq 0.6$.

* * * * *